United States Patent Office 3,736,346
Patented May 29, 1973

3,736,346
METHOD FOR THE PRODUCTION OF 1,1,3-TRIALKOXY-2-CYANOPROPANES
Masaaki Tsurushima, Kyoto, and Kozo Yatani, Yamaguchi, Japan, assignors to Takeda Chemical Industries, Ltd., Higashi-ku, Osaka, Japan
No Drawing. Filed May 28, 1971, Ser. No. 148,147
Claims priority, application Japan, June 15, 1970, 45/52,270
Int. Cl. C07c 121/34
U.S. Cl. 260—465.6    5 Claims

ABSTRACT OF THE DISCLOSURE

The present invention relates to a process for the production of a 1,1,3-trialkoxy-2-cyanopropane of the formula

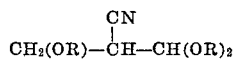

wherein R stands for a lower alkyl having 1 to 3 carbon atoms, which comprises reacting a chlorocyanohydrocarbon of the formula

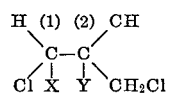

wherein X stands for hydrogen and Y stands for chlorine atom, or X and Y form together a bond between the carbon atom at the 1-position and at the 2-position, with an alkali metal alcoholate or with an alcoholic alkali metal hydroxide, the alcohol for the alcoholate or alcoholic alkali metal hydroxide being an aliphatic monohydric alcohol of 1 to 3 carbon atoms, at a temperature of from 0° C. to the boiling point of the abovementioned alcohol.

---

The present invention relates to a novel method for the production of 1,1,3 - trialkoxy-2-cyanopropanes which have been known as intermediates in the preparation of vitamin $B_1$ and its derivatives.

1,1,3-trialkoxy-2-cyanopropane has been produced using acrylonitrile as a starting compound [Journal of the American Chemical Society 67 1505 (1945), Japanese patent publication Nos. 3,924/1955 and 9,979/1956.] However, this known method requires several kinds of secondary materials including an alkali metal alcoholate, an alkali hydroxide, formic acid, methanol and dimethyl sulfuric acid, the reaction steps involved in this method are rather complicated, and furthermore, yield of the object compound is very poor. Under the circumstances, the present inventors have made extensive studies on an improved method for preparation of 1,1,3-trialkoxy-2-cyanopropanes and have found that reaction of a specific chlorocyanohydrocarbon with an alcohol or its derivative can give 1,1,3-trialkoxy-2-cyanopropanes and that the defects encountered in the known method can be eliminated by using this reaction. The present invention was accomplished on the basis of those findings.

Thus, the principal and essential object of the present invention is to provide a novel method for the production of 1,1,3-trialkoxy-2-cyanopropanes useful as an intermediate of vitamin $B_1$ and its derivatives in a high yield by simple and industrially feasible process steps using a few kinds of secondary materials.

The method of the present invention comprises reacting a chlorocyanohydrocarbon of the general Formula I:

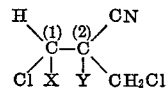 (1)

(wherein one of X and Y stands for a hydrogen atom and the other stands for a chlorine atom, or X and Y form together a bond between the carbon atom at 1-position and that at 2-position) with an alkali metal alcoholate or with an alcoholic alkali metal hydroxide.

Chlorocyanohydrocarbons of the Formula I used in the present invention as one of the starting materials include the following four compounds.

| | Boiling point | Melting point, °C. |
|---|---|---|
| cis-1,3-dichloro-2-cyanopropene | 105° C./20 mm. Hg | |
| trans-1,3-dichloro-2-cyanopropene | 86°–87° C./20 mm. Hg | |
| 1,1,3-trichloro-2-cyanopropane | 84°–85° C./8 mm. Hg | |
| 1,2,3-trichloro-2-cyanopropane | 79°–80° C./10 mm. Hg | 23 |

These chlorocyanohydrocarbons can be prepared by the steps illustrated as follows.

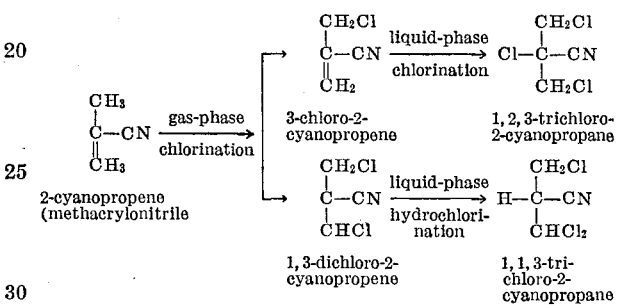

Namely, methacrylonitrile is allowed to contact with chlorine gas at about 250 to 600° C. in the presence or absence of an inert gas (e.g. nitrogen gas, carbon dioxide gas, etc.) to give a mixture of 3-chloro-2-cyanopropene and cis- and trans-1,3-dichloro-2-cyanopropene. These compounds are separated from each other by conventional manner, for example, fractional distillation. 3-chloro-2-cyanopropene is allowed to contact with chlorine gas in the presence of a solvent preferably under irradiation by rays having a wave-length of not longer than that of visible rays to give 1,2,3-trichloro-2-cyanopropane. On the other hand, 1,3-dichloro-2-cyanopropene is dissolved in a solvent and dry hydrogen chloride gas is introduced into the solution at —5° to 5° C., whereby 1,1,3-trichloro-2-cyanopropane is produced. Regarding these methods, the references are made to U.S.P. 3,515,-743 and Japanese Pat. No. 550,771.

Thus, by employing the method of the present invention in combination with the above chlorination and/or hydrochlorination step or steps, 1,1,3-trialkoxy-2-cyanopropane can be produced from methacrylonitrile using only chlorine, an alcohol and an alkali metal hydroxide as secondary materials after simple process steps, and in this method the overall yield of the object compound is very high.

The alcohol component of the alkali metal alcoholate is preferably an aliphatic monohydric lower alcohol having 1 to 3 carbon atoms. The typical examples of the alkali metal alcoholates used in the present invention include sodium methylate, sodium ethylate, sodium isopropylate, potassium methylate, potassium ethylate, potassium isopropylate, lithium methylate, lithium ethylate, lithium isopropylate, etc. These compounds are obtained by reacting the alkali metal with the corresponding aliphatic monohydric lower alcohol after a conventional manner.

The alcoholic alkali metal hydroxides include a solution of an alkali metal hydroxide (e.g. lithium hydroxide, sodium hydroxide, potassium hydroxide, etc.) in an aliphatic monohydric alcohol having 1 to 3 carbon atoms (e.g. methanol, ethanol, isopropanol, etc.).

As seen from the examples above the alcohols are, particularly, alkanols of 1 to 3 carbon atoms.

The alkali metal alcoholate or the alcoholic alkali metal hydroxide is used in an amount of at least 3 moles in terms of alcohol per mole of the starting compound (I). The reaction can proceed even in the absence of a solvent, but use of a solvent is generally desirable.

The solvents usable for this purpose may, for example, be alcohols such as methanol and ethanol, ketones such as acetone and methyl ethyl ketone, ethers such as dimethyl ether, diethyl ether, methyl ethyl ether and tetrahydrofuran, hydrocarbons such as n-hexane, benzene, toluene and xylene, and the like.

The reaction is carried out at about 0° C. to the boiling point of the alcohol used, more preferably at about 0° C. to room temperature.

Thus, there is produced the desired 1,1,3-trialkoxy-2-cyanopropane, in which the alkoxy group corresponds to the alcohol component used. Namely, the reaction of the present invention may schematically be illustrated as follows.

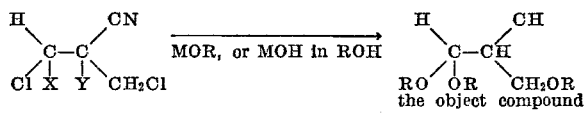

(wherein X and Y have the same meaning as above, and M is an alkali metal and R is a lower alkyl having 1 to 3 carbon atoms.)

The object compound can be, as well known, led to vitamin $B_1$ after a conventional manner (e.g. Japanese patent publication No. 3,976/1957).

For further explanation of the present invention, the following examples are given, wherein the word "part(s)" is based on weight unless otherwise noted and the relationship between "part(s)" and "volume parts(s)" corresponds to that between "grams(s)" and "milliliter(s)."

EXAMPLE 1

To ethanolic sodium ethylate solution which is prepared from 5.1 parts of metallic sodium and 100 volume parts of ethanol is added dropwise 13.6 parts of cis-1,3-dichloro-2-cyanopropene in 30 minutes with sufficient agitation under cooling at 5–10° C., and the mixture is stirred at room temperature for 30 minutes to allow the reaction to proceed. Into the reaction mixture is introduced carbon dioxide gas for neutralization of the system, and ethanol is removed by distillation. 50 volume parts of water is added to the residue, and the mixture is extracted twice with each 20 volume parts of ethyl ether. To the ether layer is added one part of powdery anhydrous potassium carbonate, and the whole mixture is dried by leaving it standing overnight. Potassium carbonate is removed by filtration, and the filtrate is subjected to fractional distillation, whereby 17.2 parts of 1,1,3-triethoxy-2-cyanopropane is obtained as the main fraction boiling at 101°–102° C./3mm. Hg. (Yield: 97%.)

EXAMPLE 2

To a solution of 8.8 parts of sodium hydroxide in 100 volume parts of methanol is added dropwise 13.6 parts of trans-1,3-dichloro-2-cyanopropene in 30 minutes with sufficient agitation under cooling at 5–10° C., and the mixture is stirred at room temperature for 30 minutes to allow the reaction to proceed. Into the reaction mixture is introduced carbon dioxide gas for neutralization of the system, and methanol is distilled off. The residue is then treated after a similar manner to Example 1 to give 15.1 parts of 1,1,3-trimethoxy-2-cyanopropane boiling at 93°–94° C./3mm. Hg. (Yield: 95%.)

EXAMPLE 3

To a solution of 18.5 parts of potassium hydroxide in 100 volume parts of ethanol is added dropwise 17.2 parts of 1,1,3-trichloro-2-cyanopropane in 30 minutes with sufficient agitation under cooling at 5–10° C., and the mixture is stirred at room temperature for 30 minutes to allow the reaction to proceed. Into the reaction mixture is introduced carbon dioxide gas for neutralization of the system, and ethanol is removed by distillation. The residue is treated after a similar manner to Example 1 to give 16.8 parts of 1,1,3-triethoxy-2-cyanopropane boiling at 101–102° C./3mm. Hg. (Yield: 95%.)

EXAMPLE 4

To a methanolic solution of sodium methylate which is prepared from 7.4 parts of metallic sodium and 100 volume parts of methanol is added dropwise 17.2 parts of 1,2,3-trichloro-2-cyanopropane in 30 minutes with sufficient agitation under cooling at 5–10° C., and the mixture is stirred at room temperature for 30 minutes to allow a reaction to proceed. Into the reaction mixture is introduced carbon dioxide gas for neutralization of the system, and methanol is removed by distillation. The residue is treated after a similar manner to Example 1 to give 15.4 parts of 1,1,3-triethoxy-2-cyanopropane boiling at 93°–94°C./3mm. Hg. (Yield: 97%.)

What is claimed is:

1. A process for the production of a 1,1,3-trialkoxy-2-cyanopropane of the formula

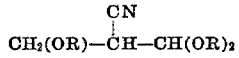

wherein R stands for a lower alkyl having 1 to 3 carbon atoms, which comprises reacting a chlorocyanohydrocarbon of the formula

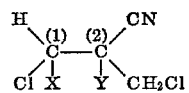

wherein X stands for hydrogen and Y stands for a chlorine atom, or X and Y form together a bond between the carbon atoms at the 1-position and at the 2-position, with an alkali metal alcoholate or with an alcoholic alkali metal hydroxide, the alcohol for the alcoholate or alcoholic alkali metal hydroxide being an alkanol of 1 to 3 carbon atoms, at a temperature of from 0° C. to the boiling point of the above-mentioned alkanol, without the addition of water to the reaction system.

2. A process according to claim 1, wherein the chlorocyanohydrocarbon is cis- or trans-1,3-dichloro-2-cyanopropene.

3. A process according to claim 1, wherein the chlorocyanohydrocarbon is 1,2,3-trichloro-2-cyanopropane.

4. A process according to claim 1, wherein the alkali metal alcoholate is sodium methylate.

5. A process according to claim 1, wherein the alcoholic alkali metal hydroxide is methanolic sodium hydroxide.

References Cited

UNITED STATES PATENTS 2,384,106   9/1945   Lichty _____ 260—465.6
3,515,743   6/1970   Tsurushima et al. __ 260—465.7

OTHER REFERENCES

Rodd: Chemistry of Carbon Compounds, vol. I—Part A, 1951, p. 321.

Wagner and Zook: Synthetic Organic Chemistry 1953, pp. 226–227.

Migrdichian, Organic Synthesis, vol. I, 1957, pp. 77–78.

JOSEPH P. BRUST, Primary Examiner

U.S. Cl. X.R.

260—465.7